March 20, 1951 C. HALL 2,545,953
ROTARY HOIST
Filed Oct. 25, 1946 4 Sheets-Sheet 1
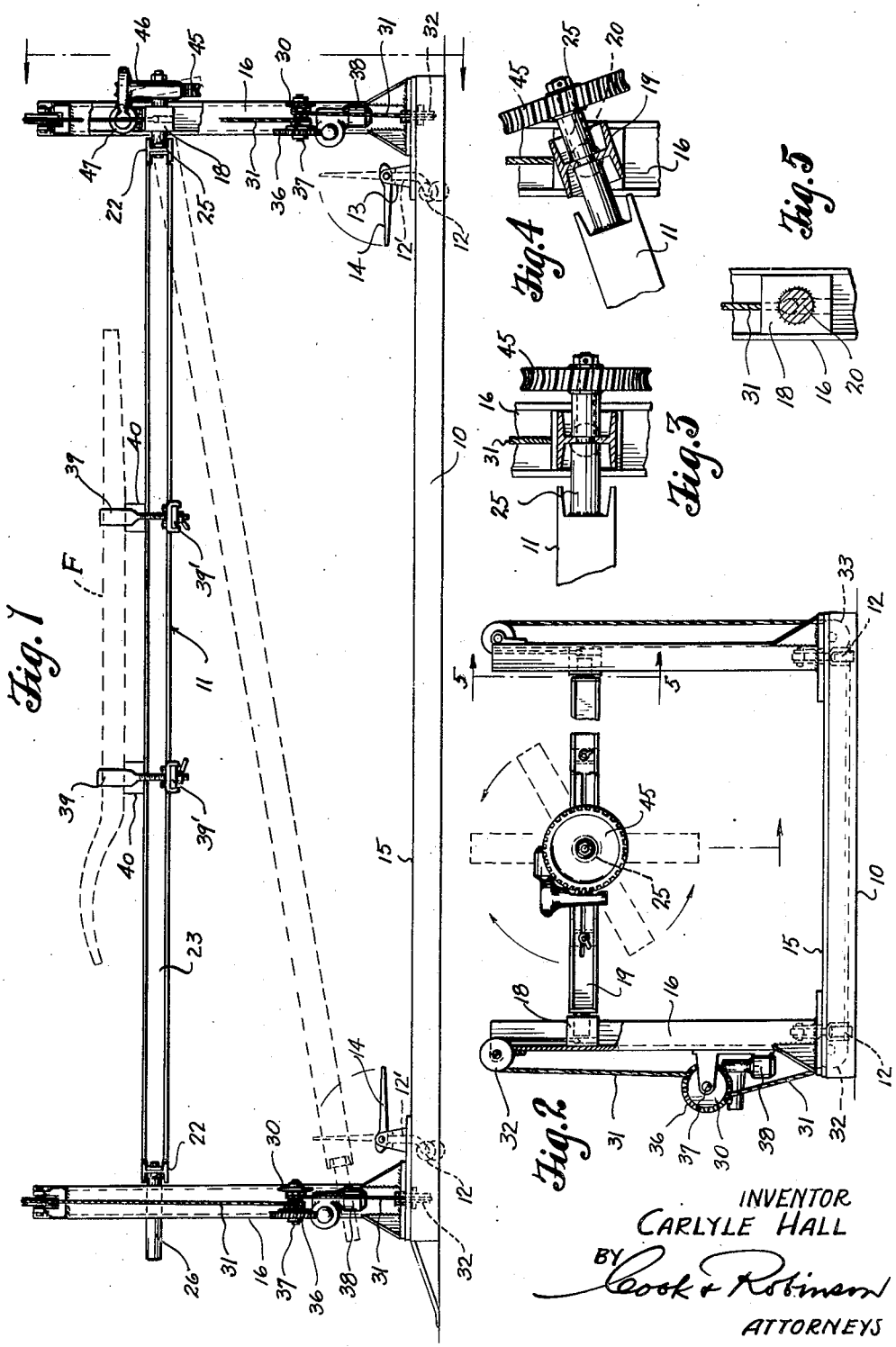
INVENTOR
CARLYLE HALL
BY Cook & Robinson
ATTORNEYS

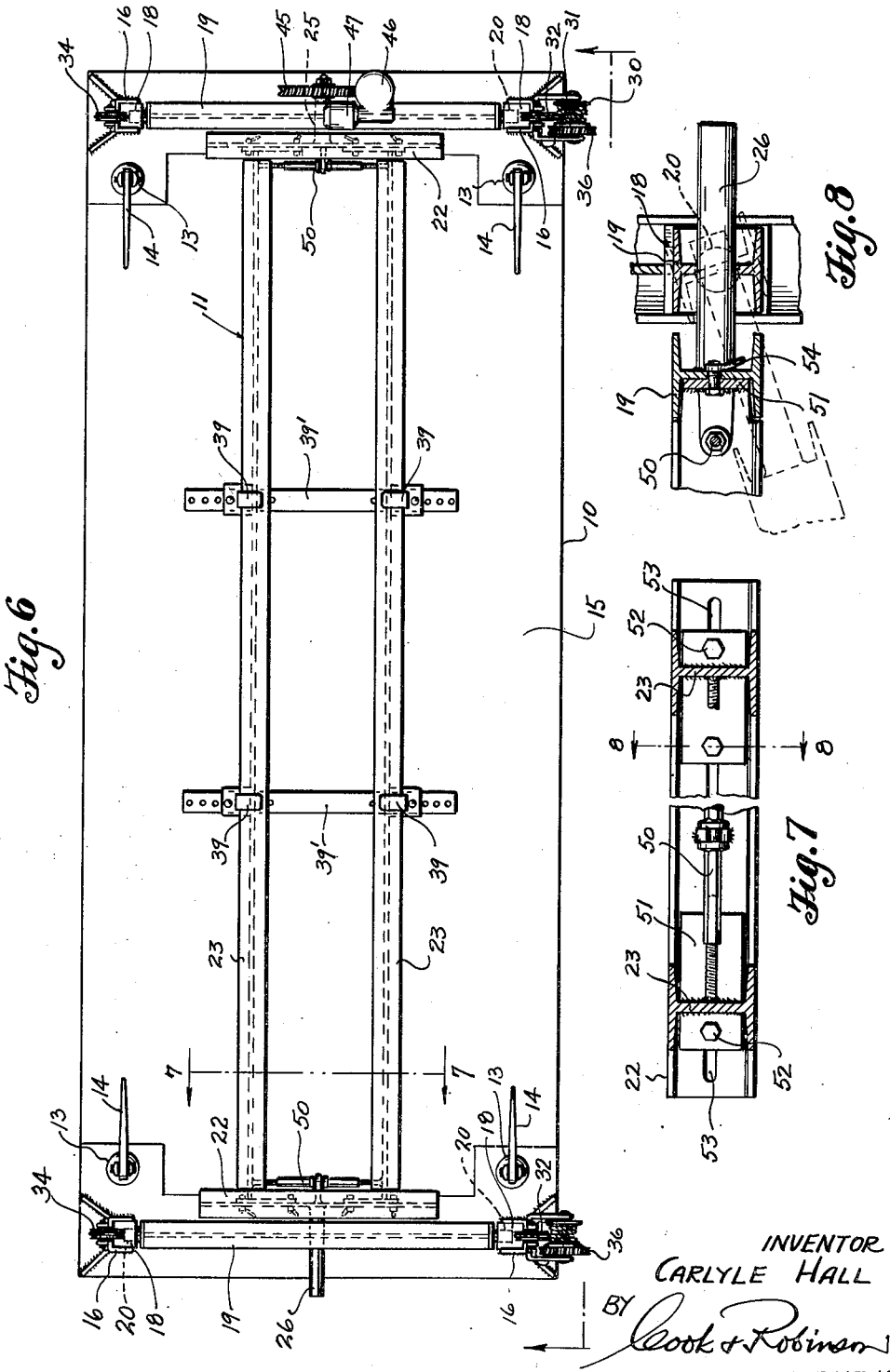

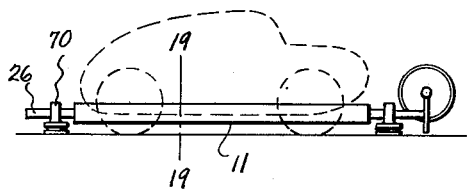
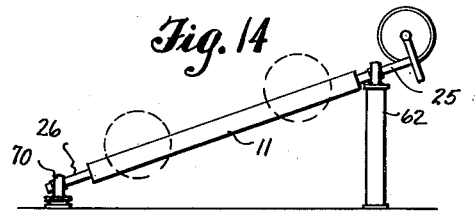
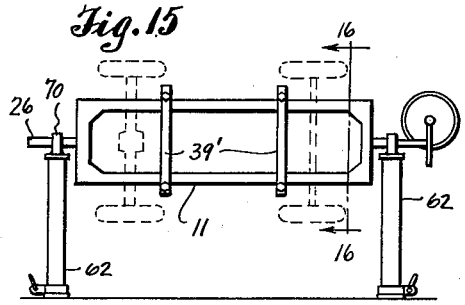
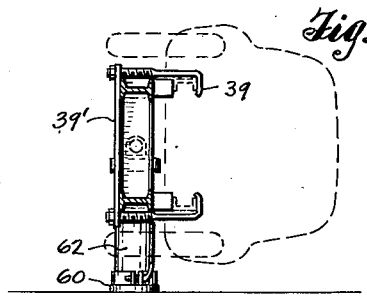
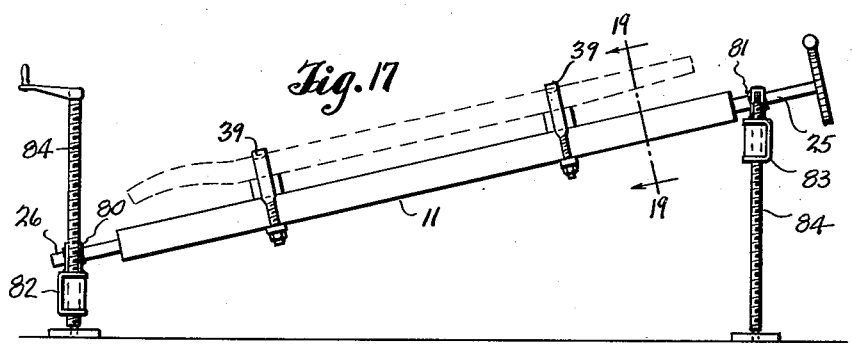
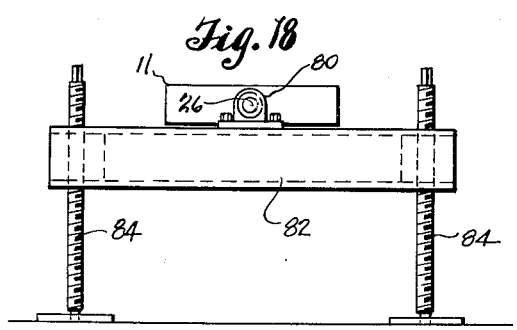
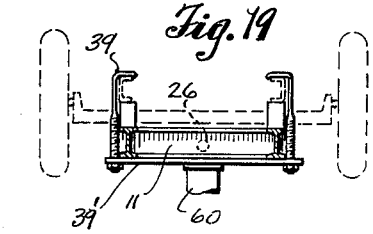
INVENTOR.
CARLYLE HALL

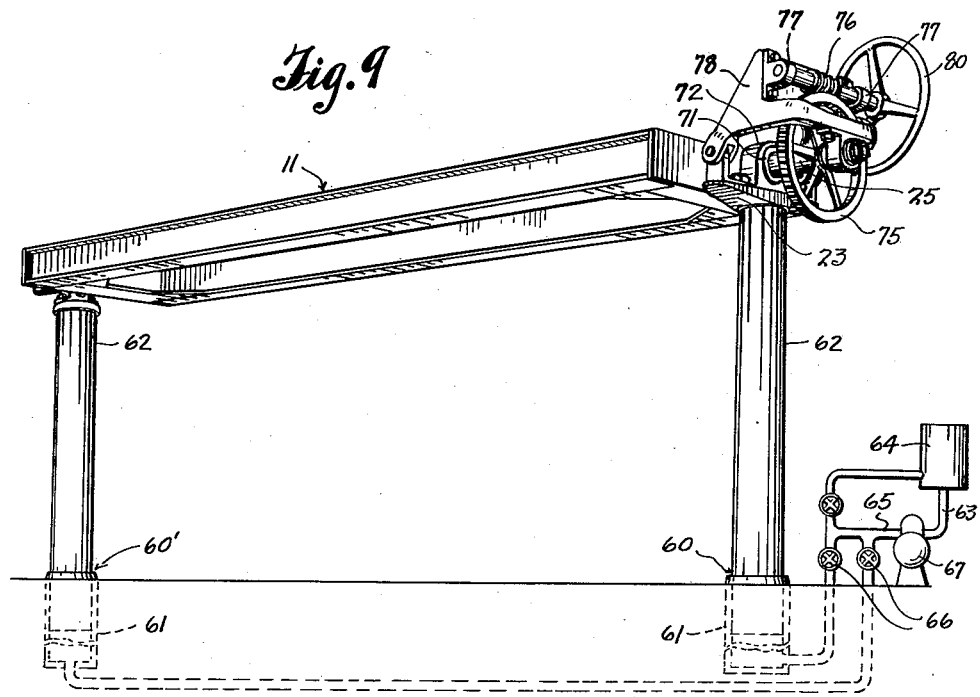
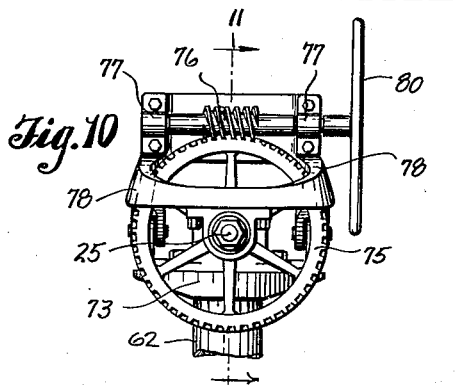
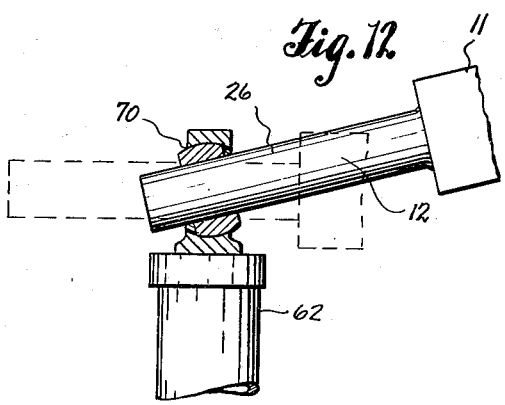
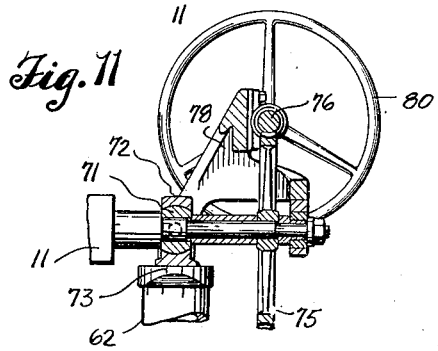

Patented Mar. 20, 1951

2,545,953

UNITED STATES PATENT OFFICE 2,545,953

ROTARY HOIST

Carlyle Hall, Seattle, Wash.

Application October 25, 1946, Serial No. 705,707

3 Claims. (Cl. 214—1)

This invention relates to improvements in devices of that kind known in the art to which they belong as "vehicle lifts," and it has reference more particularly to lifts, or hoists, for the handling of present day motor vehicles, such as automobiles, trucks, trailers and the like, to facilitate such work thereon as required for repair, adjustment, frame straightening, greasing and inspection.

Explanatory to the present invention, it will here be stated that it has always been a difficult and undesirable task to make those most frequently required repairs and adjustments in motor vehicles because of the necessity of the workman working beneath the vehicle, either while lying on his back on the floor or while standing in a pit provided to give better accessibility to those parts. Inspection has most frequently necessitated that the workman should lie on his back beneath the car in a position that greatly hinders and slows down any repair or adjustment to be made, and where the vision is so impaired that it becomes extremely difficult to do good work. Furthermore, these conditions under which the workman must do the work, contribute to the high costs of repair work and to inefficiency of the work done.

In view of the above it has been the principal object of this invention to provide a practical and relatively inexpensive means, in the nature of a lift or hoist, for use in the repair, inspection and readjustment of motor vehicles, whereby the work is made easier; whereby the inspection of parts of a vehicle at the underside of the vehicle frame may be better accomplished; whereby all work on the vehicle may be done by the workman while he is in a standing position and outside of any pit and settled gas fumes; and whereby the cost of repair, adjustment and inspection may be materially lessened.

More specifically stated, the objects of the present invention reside in the provision of a vehicle lift having a turning frame that may be disposed at floor level for the running of the vehicle thereonto, and whereby the vehicle, after being secured to the said frame, may be raised, tilted or inclined thereby as may be required, or desired, by the workman to give him easy and direct accessibility to those parts beneath the vehicle frame which usually, for repair or adjustment, require that the workman crawl beneath the vehicle and work while lying on his back.

A further object of this invention is to provide a lift that gives unrestricted access to all parts at the under side of the vehicle that might require repair. Also, to make possible the independent lifting by the turning frame of one end portion of the vehicle above the level of the other and the rotation of the turning frame in either direction and thus to virtually turn the vehicle on its side.

Another object of my invention is to provide a portable lift, that may be moved about on rollers or casters on a floor space to positions most satisfactory, and which may, when located at a selected position, be set down solidly upon the floor for use.

Still another object of the invention is to provide apparatus that may be incorporated with present day lifts, as provided for grease or repair jobs, as a part thereof; that is, to provide apparatus that may be applied to present day air or hydraulic lifts to adapt them to the present uses.

Yet another object of the invention is to provide a lift embodying a frame structure with longitudinal beams so designed that they may be used in the straightening of the frame members of a vehicle, and may be adjusted toward or from each other to best adapt them to their various uses.

Still further objects of the invention reside in the details of construction of parts as embodied in the present preferred and alternative structures, in their assembled relationship and in their mode of use, as will hereinafter be fully described.

In accomplishing these and other objects of the invention, I have provided the improved details of construction, the preferred forms of which are illustrated in the accompanying drawings, wherein—

Fig. 1 is a side view of a portable vehicle lift constructed in accordance with the present invention, and showing the lift frame in an elevated position.

Fig. 2 is an end view of the frame, showing the elevating and turning gearing; certain parts being broken away for better illustration.

Figs. 3 and 4 are sectional details showing, in side view, the end support of the turning frame, and its pivotal action when that end is lifted above the other.

Fig. 5 is a sectional detail taken on line 5—5 in Fig. 2.

Fig. 6 is a top, or plan, view of the lift.

Fig. 7 is an enlarged section taken on line 7—7 in Fig. 6.

Fig. 8 is an enlarged sectional detail of one of the end supports of the vehicle turning frame.

Fig. 9 is a perspective view of a lift or hoist of a modified form utilizing hydraulic jacks for lifting purposes.

Fig. 10 is an end view of the frame turning gearing as used in the device of Fig. 9.

Fig. 11 is a section on line 11—11 in Fig. 10.

Fig. 12 is a sectional detail of one of the frame end bearings of the device of Fig. 9.

Fig. 13 is a side view, showing the vehicle lifting and turning frame in lowered position and indicating the manner of locating a vehicle thereon.

Fig. 14 is a view indicating the manner of lifting of one end of the frame above the other.

Fig. 15 is a side view, showing the lift in an elevated position and the frame rotated to a vertical plane.

Fig. 16 is a cross section on line 16—16 in Fig. 15.

Fig. 17 illustrates a lift of another modified form, utilizing screw type supports.

Fig. 18 is an end view of the same.

Fig. 19 is a cross section taken on line 19—19 in Fig. 13.

Referring more in detail to the drawings—

In Figs. 1 and 6, I have illustrated a lift, or hoist, of a portable character which at present is considered to be the preferred form of structure embodied by this invention, due to the fact that it is less expensive to construct and can easily be moved from place to place as needed. As herein shown, the device comprises a base frame structure designated in its entirety by numeral 10 and a vehicle lifting and turning frame designated in its entirety by numeral 11. The base frame 10 is of rectangular form, of rigid construction, and is designed to rest flatly on a floor surface when the structure is in use.

To facilitate the present lift being moved or shifted on a floor surface, the base frame 10 is equipped at its four corners with caster wheels 12. Each wheel has a vertically extending mounting stem 12' pivotally and longitudinally movably contained in a bearing 13 fixed to the frame, and pivoted on these bearings are hand levers 14 engageable with the stems 12' and whereby the casters may be shifted from positions at which they will operate to support the base frame free of the floor for movement of the hoist from one position to another, or to positions allowing the frame 10 to rest solidly upon the floor surface.

The base frame preferably is made up of opposite side beams and opposite end beams, preferably of I-beam form, joined rigidly together by suitable means. The base frame may or may not be covered with a floor. In the present instance, it is shown as having a floor covering overlying the longitudinal and end beams, and this is designated by reference numeral 15.

Erected upon the base frame at its four corners are vertical posts, or standards 16, each of which is rigidly and solidly fixed in place. Preferably the standards comprise short lengths of channel iron, and they are so disposed that the channels of posts at the same end of the base frame face toward each other, as will be understood by reference to Fig. 6.

Mounted for vertical guided travel in each of the channel-form posts 16 is a bearing block 18, and extending between the paired bearing blocks at the ends of the frame, are cross beams 19 which preferably are of I-beam form, and each of these has pivot supports 20 at its opposite ends rotatably mounted in the corresponding bearing blocks 18.

The vehicle supporting and turning frame, which is designated in its entirety by reference numeral 11, extends centrally of and lengthwise of the base frame structure between the cross beams 19—19 at its opposite ends, as is best shown in Fig. 6. It comprises opposite end beams 22—22 and longitudinal opposite side beams 23—23, the latter being adjustably supported by the end beams for movement from and toward each other. The end beams 22 lie close to and parallel with the corresponding beams 19, and centrally between their ends are equipped, respectively, with supporting shafts, or axles 25 and 26. These are coaxially aligned and are rotatably mounted in the cross beams 19 so that the frame 11 may be turned or rotated on its longitudinal axis, as presently will be fully explained. As shown in Fig. 4, the shaft 25 is held against longitudinal shifting on its supporting beam 19, but the pivot shaft 26 is adapted to slide endwise as well as to pivot in order to accommodate itself to the position of the frame 11 when one end is raised above the other.

The frame 11 may be adjusted vertically between the elevated position in which it is shown in Fig. 1 and a lower position flatly against the base 10, or one end thereof may be raised above or lowered below the opposite end, as indicated in dotted lines in Fig. 1. The means for accomplishing this adjustment of the frame 11 is shown best in Figs. 1, 2 and 6, wherein it is shown that cable winding drums 30—30 are mounted on the outside of the corner posts at the same side and at opposite ends of the frame, and from each of these drums a pair of cables 31—31 extend; one of which cables extends upwardly and over a sheave wheel 32 mounted on the upper end of the post, as seen in Fig. 2, thence downwardly within the post channel, and is fixed at its end in the bearing block 18 that is contained for vertical travel in the channel. The other cable 31 passes downwardly from the drum beneath a sheave wheel 33 within the base frame structure, then to the opposite side of the base frame and beneath a similar sheave wheel 33', then upwardly along the outside of the post 16 at that side to the top thereof and over a sheave wheel 34, thence downwardly, and is fixed at its end in the bearing 18 that is contained in the channel of that post.

The cables extended from each drum are of such lengths that the blocks 18 supported thereby will be sustained at the same horizontal levels, and each drum 30 has a driving gear wheel 36 fixed on its mounting and driving shaft 37 adapted to be driven through suitable reduction gearing, by a reversible electric motor 38 mounted on the drum supporting post to pay out or wind in the cables, thus to raise or lower the cross beam 19. It is also to be understood that the drums at opposite ends of the frame structure may be individually operated to selectively raise or lower the cross beams 19 so that either end of the frame 11 may be raised or lowered independently of the other end.

In preparing to use the lift, the frame 11 is first lowered down against the base frame, then the vehicle that is to be worked on is driven onto the base frame and properly located over the frame 11, for example, as indicated in Fig. 13. The frame 11 is then lifted up against the vehicle frame by the means provided and is clamped to the longitudinal beams of the vehicle frame. In Fig. 1, I have indicated at F what may be the frame structure of an automobile that is located upon the frame 11, and have shown clamping devices at 39 supported by the frame 11 and applied to the longitudinal beams of the vehicle frame. Spacer blocks 40 may be disposed between the vehicle frame and the frame 11 if so desired.

In one form of clamping means, clamp bars 39' are extended transversely of frame 11 beneath the longitudinal beams, and are adjustable therealong, and at their ends mount the clamp members 39 therein for application over the beams of the vehicle chassis.

As was previously explained, one of the purposes of the present apparatus is to provide for the lifting one end of the vehicle above the other end to accommodate a workman in inspecting or repair of parts, or to lift the vehicle while supported horizontally to an elevation at which it may be turned on its side, as indicated in Fig. 16, for an easy inspection of parts at the under side of the vehicle frame. The raising or lowering of both or either of the opposite ends of the frame 11 is accomplished through use of the cable mechanisms previously described. The means for rotating the frame is accomplished by a frame turning gearing which is best illustrated in Figs. 2 and 6, wherein it is shown that the frame supporting shaft 25 extends rotatably through the adjacent cross beam 19 and at its end is equipped with a turning gear wheel 45. This gear meshes with a driven gear of a reduction gear mechanism designated at 46 operated in connection with an electric motor 47 which is operatively mounted upon the cross beam 19. The electric motor 47 is of the reversible kind and may be energized to turn the gear wheel 45 in either direction, thus to likewise rotate the frame 11 upon its longitudinal axis. With the understanding that the vehicle is fixedly attached to the frame 11, it will be obvious that the turning of the frame likewise turns the vehicle, and it may be tipped to one side or the other to any extent required or desired by the workman to facilitate his inspection and repair of parts that are normally difficult to reach.

In order that the longitudinal beams 23—23 of the frame 11 may be adjusted in their spacing to best accommodate them to the vehicle being worked on, I slidably support each at its opposite ends between the horizontal flanges of the cross beams 22, as has been shown in Fig. 8, and I have joined the corresponding ends of the beams 23—23 with turnbuckle adjusting means designated in Figs. 6 and 7 by numeral 50. Plates 51 are fixed to the ends of beams 23 to engage flatly against the web portions of the cross beams 22 and bolts 52 are extended through these plates and through longitudinal slots 53 in the webs and clamp levers 54 are threaded onto the bolts, as in Fig. 8, to draw the bolts tight and secure the parts at any set position of adjustment.

In the device illustrated by Figs. 1 to 8, I employ the frame 11 with its end supports 25 and 26 about which the frame may be turned on its longitudinal axis. But in this showing, the frame is supported from the upper ends of lifting jacks designated by reference numerals 60 and 60'. Each of these jacks comprises a hydraulic cylinder 61 that is supported vertically on a base structure below floor level, and a piston shaft 62 reciprocally mounted therein and adapted to be moved between lowered and extended positions by the application of hydraulic medium to the lower end of the cylinder. The means for accomplishing this is old and well known and is diagrammatically indicated in Fig. 9 as comprising a pump 67 connected by pipe 68 with a source of supply of hydraulic medium, indicated at 64, and by pipe 65 with the lower ends of the jack cylinders. Valve devices, as at 66, are operable to permit return flow for lowering the jack pistons.

In this modification of the device, the frame supporting pivot shaft 26 is slidably and rotatably contained in a bearing 70 on the upper end of a jack piston, as seen in Fig. 12, and the pivot of shaft 25 is rotatably fixed in a bearing 71 of ball form that is rotatably contained in a bearing block 72, fixed on a cross arm 73 on the upper end of the other jack piston, as shown in Fig. 11.

For rotating the frame 11 in this form of device, I provide a worm gear wheel 75 on the end of shaft 25, and a worm shaft 76 in mesh therewith as shown in Fig. 11. Shaft 76 is rotatably supported at its ends in bearings 77—77 of a frame 78 that is fixed upon the cross arm 73, and a hand wheel or crank 80 is fixed to shaft 76 for turning the frame.

The uses of this device are like those of the device of Fig. 1 and the mode of applying a vehicle thereto and the turning or tilting is the same.

In Figs. 17 and 18, I have illustrated still another alternative form of construction wherein I employ a turning frame 11 like that of the devices already described, equipped at its opposite ends with the supporting trunnions or shafts 25 and 26 which are mounted, as in the device of Fig. 9 in bearings 80 and 81 on cross beams 82 and 83. These latter beams are equipped at their opposite ends with vertical jack shafts 84 threaded through the beam ends and adapted to be turned, for example by means of a crank as shown at 85 in Fig. 17, to raise or lower the cross beams as required for the raising or lowering of frame 11. In this instance one or both ends of the frame 11 can be raised, so that the tilting or turning of the supported vehicle is substantially as by use of the devices of Figs. 1 and 9.

With such device so constructed and arranged, use thereof would be as follows: First the frame 11 would be lowered flatly against the floor or base and the vehicle to be worked on would be run between end standards at either end of the structure to a position centered over the frame and secured by the clamp members, preferably applied about the frame beams or vehicle axles. Then the frame 11 is raised to a position giving the workman access to the part to be worked on. As a general rule, the frame would be elevated to a horizontal position at a height for a quick inspection by the workman walking beneath the vehicle, then the frame could be rotated on its longitudinal axis to either side and to any extent required to give the workman the best possible working condition for the job at hand. In some instances it may be practical and desirable to elevate the frame at one end only, for example, to make a front axle or rear axle inspection. It is desirable in this connection to point out that the vehicle supporting and turning frame 11 may be interchangeably used with structures of the type shown in Figs. 1 and 9. Where a shop is already equipped with hydraulic or air operated hoists, the present equipment, including the frame 11, its end bearings and turning gearing, may be applied directly to the upper ends of such hoists and thus the expense of the entire equipment would be eliminated.

Having thus described my invention, what I claim as new therein and desire to secure by Letters Patent is:

1. A device of the character described comprising a hoisting frame adapted for the support of an automobile thereon, clamping devices associated with the said frame for the temporary fixed securement of the automobile thereon, pivot shafts extended from the opposite ends of the said frame, hoists disposed at opposite ends of the frame, bearings supported by said hoists and containing the said pivot shafts therein for raising and lowering the frame by means of the hoists, means on one of the hoists for rotating the hoisting frame on its pivot shafts and for holding it against free rotation; said hoisting frame comprising opposite end members and opposite side members adjustably supported therefrom, and means connected with the end members and side members for effecting adjustment in lateral spacing of the said side members.

2. A device of the character described comprising a hoisting frame of open rectangular form adapted for the support of an automobile thereon through the mediacy of its axles, clamping devices on the frame for the fixed securement of an automobile thereon, hoists disposed at opposite ends of the frame, axially aligned pivot shafts extended from opposite ends of the frame, bearings on the hoisting devices containing the said pivot shafts therein for the raising and lowering of the frame and for its rotation about the axial line of said pivot shafts, means on one of the hoisting devices for rotating the frame and for holding it against free rotation; said hoisting frame comprising opposite side members and opposite end members adjustably supporting the side members therefrom, and turnbuckle means for effecting adjustment in the lateral spacing of said longitudinal beams by simultaneous and equal movements of each beam relative to longitudinal axis of the frame.

3. A device of the character described, comprising a base frame, a pair of standards mounted in transversely spaced relationship at opposite ends of the frame, cross-bars extended between paired standards at opposite ends of the frame for guided vertical travel at their ends thereby, a hoisting frame extended longitudinally between the cross bars and adapted to rest flatly upon the base frame for the movement of an automobile thereover, trunnion supports at the opposite ends of the hoisting frame mounted in the cross bars for the support and rotatable adjustment of the hoisting frame, and independently operable hoisting means associated with each of the standards and ends of the cross beams for moving the latter between lowered and raised positions for the raising and lowering of the hoisting frame; said cross bars being rotatable about their longitudinal axes, and one of the trunnion supports being longitudinally slidable in its mounting bar to permit raising of one end of the hoisting frame above the other.

CARLYLE HALL.

REFERENCES CITED

The following references are of record in the file of this patent:

UNITED STATES PATENTS

| Number | Name | Date |
|---|---|---|
| 714,346 | White | Nov. 25, 1902 |
| 1,332,599 | Bradford | Mar. 2, 1920 |
| 1,339,459 | La Chapelle | May 11, 1920 |
| 1,477,471 | Wellman | Dec. 11, 1923 |
| 1,519,357 | Campbell | Dec. 16, 1924 |
| 1,863,309 | Kitts | June 14, 1932 |
| 2,015,357 | Weaver | Sept. 24, 1935 |
| 2,227,688 | Wood | Jan. 7, 1941 |